(12) United States Patent
Ahmad

(10) Patent No.: US 10,184,388 B1
(45) Date of Patent: Jan. 22, 2019

(54) ENGINE PISTON

(71) Applicant: Caterpillar Inc., Peoria, IL (US)

(72) Inventor: Chad Ahmad, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 220 days.

(21) Appl. No.: 14/954,046

(22) Filed: Nov. 30, 2015

(51) Int. Cl.
F02F 3/00 (2006.01)
F02B 23/06 (2006.01)
F16J 1/00 (2006.01)
F02F 3/26 (2006.01)

(52) U.S. Cl.
CPC .......... F02B 23/0696 (2013.01); F02F 3/26 (2013.01); F16J 1/00 (2013.01)

(58) Field of Classification Search
CPC ........ F02F 3/00; F02F 3/26; F02F 3/28; F02F 3/0076; F02F 2003/0007; F16J 1/00; F16J 1/001; F16J 1/09; F02B 23/06; F02B 23/063; F02B 23/0693; F02B 23/0696
USPC ...... 123/197.2, 193.1, 193.6; 92/172, 181 R, 92/208
See application file for complete search history.

(56) References Cited

U.S. PATENT DOCUMENTS

| 4,721,080 A * | 1/1988 | Moriyasu ............ F02B 23/06 123/256 |
| 5,746,169 A * | 5/1998 | Issler ............... F02B 23/0672 123/193.6 |
| 6,314,933 B1 * | 11/2001 | Iijima ............. F02B 23/0696 123/193.6 |
| 6,935,301 B2 * | 8/2005 | Liu ................. F02B 23/0672 123/193.6 |
| 6,997,158 B1 * | 2/2006 | Liu ................. F02B 23/0672 123/279 |
| 7,185,614 B2 * | 3/2007 | Meffert ............. F02B 23/0672 123/269 |
| 7,210,448 B2 | 5/2007 | Stanton et al. |
| 7,942,126 B2 | 5/2011 | Zöller et al. |
| 8,156,927 B2 * | 4/2012 | Iikubo ............. F02B 23/0672 123/661 |
| 8,291,881 B2 | 10/2012 | Oxborrow et al. |
| 8,677,970 B2 | 3/2014 | Venugopal et al. |
| 8,770,168 B2 | 7/2014 | Cornwell et al. |
| 9,046,053 B2 * | 6/2015 | Will ............... F16J 15/00 |
| 2013/0008307 A1 * | 1/2013 | Will ............... F16J 15/00 92/172 |

(Continued)

FOREIGN PATENT DOCUMENTS

| CN | 101769195 A | 7/2010 |
| EP | 0845589 A1 | 6/1998 |
| EP | 2752563 A1 | 7/2004 |

(Continued)

Primary Examiner — Grant Moubry
(74) Attorney, Agent, or Firm — Leydig, Voit & Mayer, Ltd.

(57) ABSTRACT

A piston for an internal combustion engine includes a piston body forming a crown portion and a skirt portion, the crown portion forming a generally concave bowl extending symmetrically around the piston body with respect to an axis of symmetry of the crown portion. The bowl forms a first lip and a second lip that are arranged in a stepped configuration along a side margin of the bowl. A depressed ledge having a generally annular shape is further formed in the crown portion, the depressed ledge including a flat, annular surface extending along a plane that is parallel to a plane defined by the generally flat crown surface.

9 Claims, 2 Drawing Sheets

(56) References Cited

U.S. PATENT DOCUMENTS

2013/0239925 A1 9/2013 Karch et al.

FOREIGN PATENT DOCUMENTS

| EP | 2752564 A1 | 7/2004 |
| EP | 1630380 B1 | 5/2011 |
| WO | WO 2008/078270 A1 | 8/2005 |

* cited by examiner

ENGINE PISTON

TECHNICAL FIELD

This disclosure relates generally to internal combustion engines and, more particularly, to pistons operating within engine bores.

BACKGROUND

Internal combustion engines typically include one or more pistons interconnected by connecting rods to a crankshaft. The pistons are typically disposed to reciprocate within bores formed in a crankcase. A typical piston includes a head portion, which at least partially defines a combustion chamber within each bore, and a skirt, which typically includes a pin opening and other support structures for connection to the connecting rod of the engine. In general, a piston is formed to have a generally cupped shape, with the piston head forming the base, and the skirt portion being connected to the base and surrounding an enclosed gallery of the piston. In typical applications, lubrication oil from the engine is provided within the gallery of the piston during operation to convectively cool and lubricate various portions of the piston.

A typical piston head also includes an outer cylindrical wall having one or more circumferentially continuous grooves formed therein. These grooves typically extend parallel to one another and are appropriately sized to accommodate sealing rings therewithin. These sealing rings create sliding seals between each piston and the crankcase bore it is operating within. Typically, the groove located closest to the skirt of the piston accommodates a scrapper ring, which is arranged to scrape oil clinging on the walls of the piston bore during a down-stroke of the piston. Oil that may remain wetting the walls of the bore following the down-stroke of the piston may enter the combustion chamber and combust during operation of the engine.

In general, the piston operates by reciprocating within a bore formed in a cylinder case of the engine, which creates a variable volume that can compress a fuel/air mixture provided therein. The combusting fuel/air mixture expands and pushes the piston to increase the variable volume, thus producing power. Fuel can be provided directly or indirectly within the variable volume, while air and exhaust gas is provided or removed from the variable volume through one or more intake and exhaust valves that selectively fluidly connect the variable volume with intake and exhaust collectors.

The materials used to construct the walls of the engine cylinders, the piston, the various valves associated with the variable volume, and other surrounding engine structures, are selected to withstand high temperatures and pressures that are present during engine operation. Various features of the piston are also shaped to promote the efficient burning of fuel within the piston, reliability of the various engine components associated with the engine cylinders, and other considerations. However, it is always desired to increase the reliability and service life of these and other engine components, as well as promote the efficient operation of the engine in terms of reducing fuel consumption and emissions and increasing power and efficiency.

One example of an engine piston having shaped features to promote efficient fuel burning can be seen in U.S. Pat. No. 7,942,126 (the '126 patent), which is directed to a "Method for Operating an Internal Combustion Engine and Internal Combustion Engine for such a Method." The '126 patent describes a piston top having integrally formed therein a piston recess which merges into an essentially annular stepped space, and an injector forming injection jets directed toward the stepped space.

According to the '126 patent, the injection jets are deflected by the stepped space into a first part quantity of fuel, which is directed in an axial direction and a radial direction into the piston recess, and a second part quantity of fuel is deflected in the axial direction and the radial direction over the piston top and third part quantities of fuel are deflected into a circumferential direction so as to impinge one onto the other in the circumferential direction and to be deflected radially inwardly. As can be appreciated, for the engine of the '126 to operate as described, the start of injection and the injection duration must be precisely coordinated with one another and with the crank angle of the internal combustion engine. Such coordination, however, makes it difficult to operate the engine efficiently over a broad range of engine operating conditions and environmental factors such as temperature, which may affect engine operation.

BRIEF SUMMARY OF THE DISCLOSURE

In one aspect, the disclosure describes a piston for an internal combustion engine. The piston includes a piston body forming a crown portion and a skirt portion. The skirt portion includes a pin bore that is arranged to receive a pin for connecting the piston to a connecting rod. The skirt portion further forms two guide surfaces along outer margins of the skirt portion. The crown portion forms a generally cylindrical surface surrounding the crown portion, and a generally flat crown surface extending around an end of the crown portion disposed opposite the skirt portion. A generally concave bowl is formed in the crown surface and within the generally cylindrical surface, the generally concave bowl extending symmetrically around the piston body with respect to an axis of symmetry of the crown portion. The generally concave bowl forms a first lip and a second lip that are arranged in a stepped configuration along a side margin of the generally concave bowl. The crown portion further forms a depressed ledge having a generally annular shape. The depressed ledge includes a flat, annular surface extending along a plane that is parallel to a plane defined by the generally flat crown surface, and is disposed between the generally flat crown surface and the generally concave bowl.

DETAILED DESCRIPTION

This disclosure relates to pistons for use in internal combustion engines. In one aspect, the disclosure describes an embodiment for an engine piston having features that can set up flow fields and turbulence to promote combustion of fuel within the cylinder over a wider range of crankshaft angles than was attainable with previous piston designs. Such features of the piston, depending on the type of engine operation, for example, spark ignition or compression ignition, can operate to contain, mix and/or direct various fuel containing masses within the piston to increase engine efficiency, decrease heat rejection, shorten burn time, and also control component temperatures, thus increasing component reliability and service life. As discussed herein, the mixing or directing of material within the cylinder may occur at least for an instant and may last no more than a few thousandths of a second while an injection of fuel and/or a combustion flame is present within the cylinder, or over portions of that period.

Figure 1:
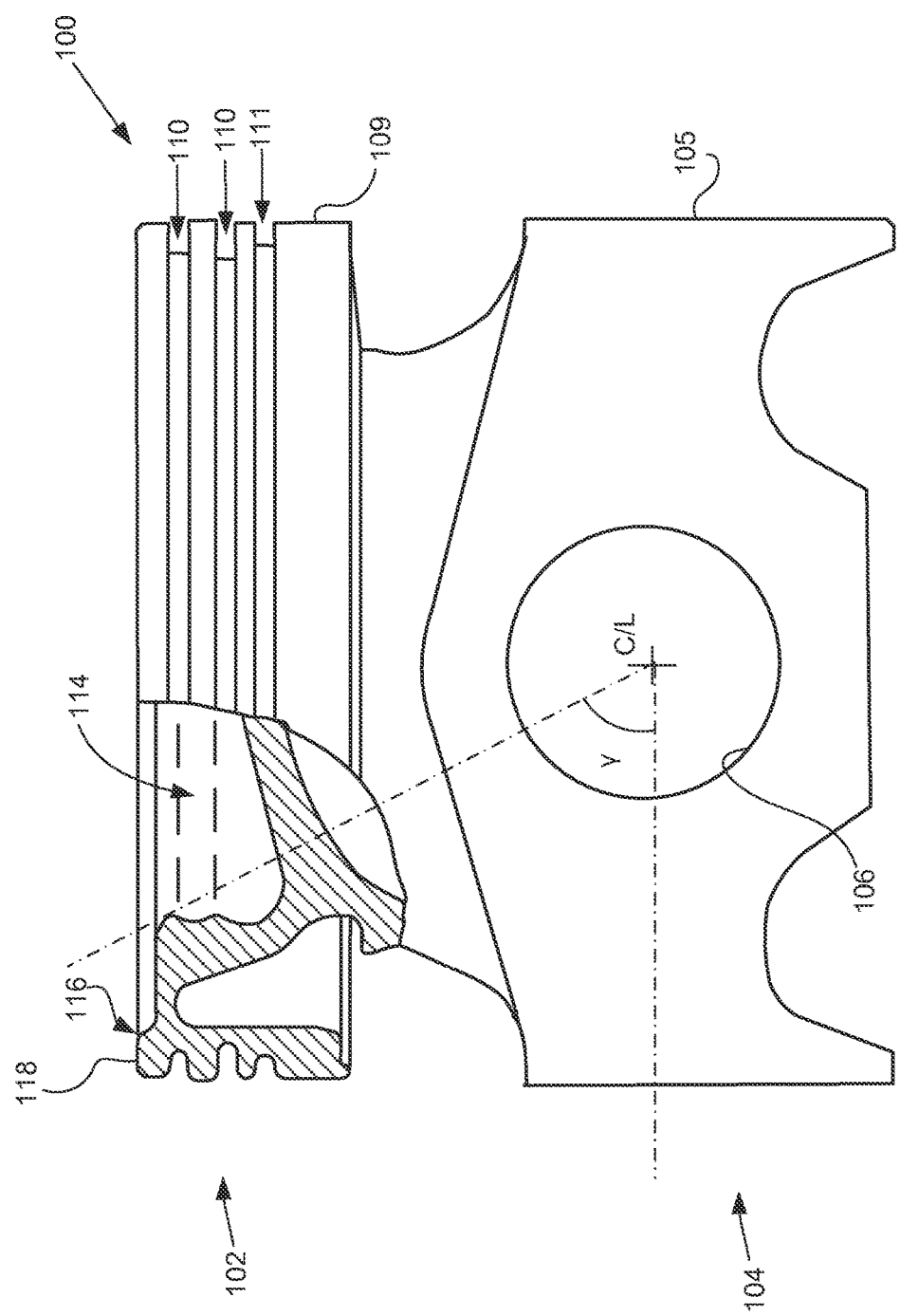
FIG. 1 is a fragmented view of a piston in accordance with the disclosure.

For purpose of illustration of certain features of an engine piston in accordance with the disclosure, a partially fragmented view of a piston 100 for an engine is shown from a side perspective in FIG. 1. The piston 100 includes a crown portion 102 and a skirt portion 104. The skirt portion 104 forms a pin bore 106 that accommodates a pin (not shown) used to pivotally connect the piston to a connecting rod (not shown), which is connected to an engine crankshaft (not shown) in the known fashion. The skirt portion 104 further includes two guide surfaces 105 disposed on diametrically opposite sides of the piston 100. In an alternative embodiment, the guide surfaces may be integrated into a single guide surface extending substantially around the piston. In the illustrated embodiment, the two guide surfaces 105 extend at least along cross sections of the piston that include a piston cross section 103, which is shown in FIG. 1 and which is perpendicular to a centerline, C/L, of the pin bore 106. On either side of the piston 100, the two guide surfaces 105 may extend over two angular portions of the periphery of the piston.

The crown portion 102 forms a series of channels extending in parallel to one another that can accommodate piston rings, oil scrapper rings and other components. In the illustrated embodiment, two piston ring grooves 110 and one oil collection groove 111 are formed in the outer cylindrical wall 109. The piston ring grooves 110 accommodate ring seals (not shown) that slidably and generally sealably engage the walls of the engine cylinder in which the piston 100 is reciprocally disposed, and the oil collection groove 111 collects oil, which is then allowed to flow back down into the engine. An outer diameter of the two guide surfaces 105 is arranged such that the piston is prevented from rotating or binding within the bore in which it is reciprocally disposed during operation.

Figure 2:
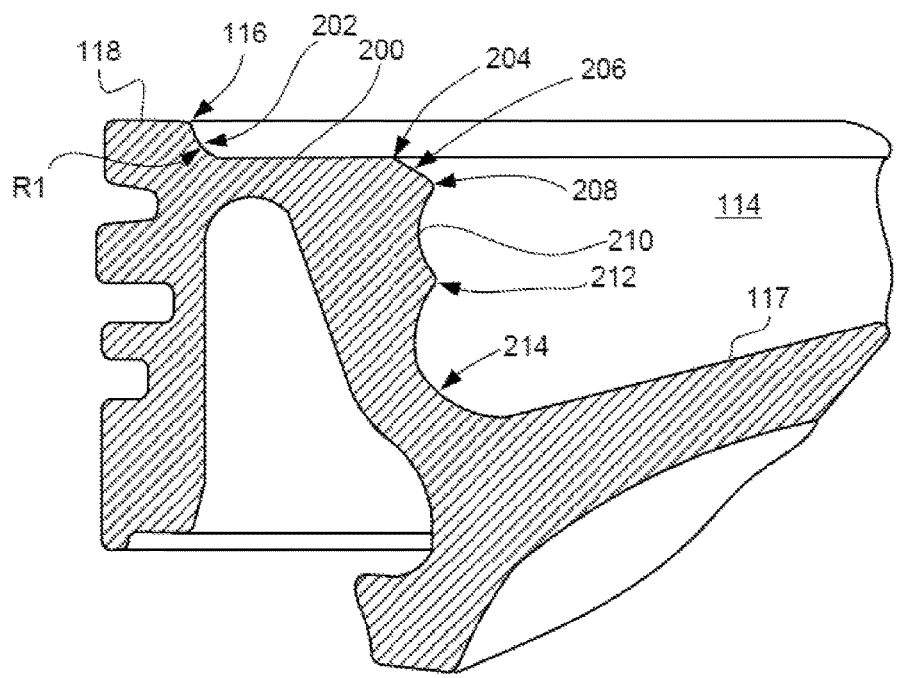
FIG. 2 is an enlarged detail of a cross section of the piston shown in FIG. 1.
Figure 3:
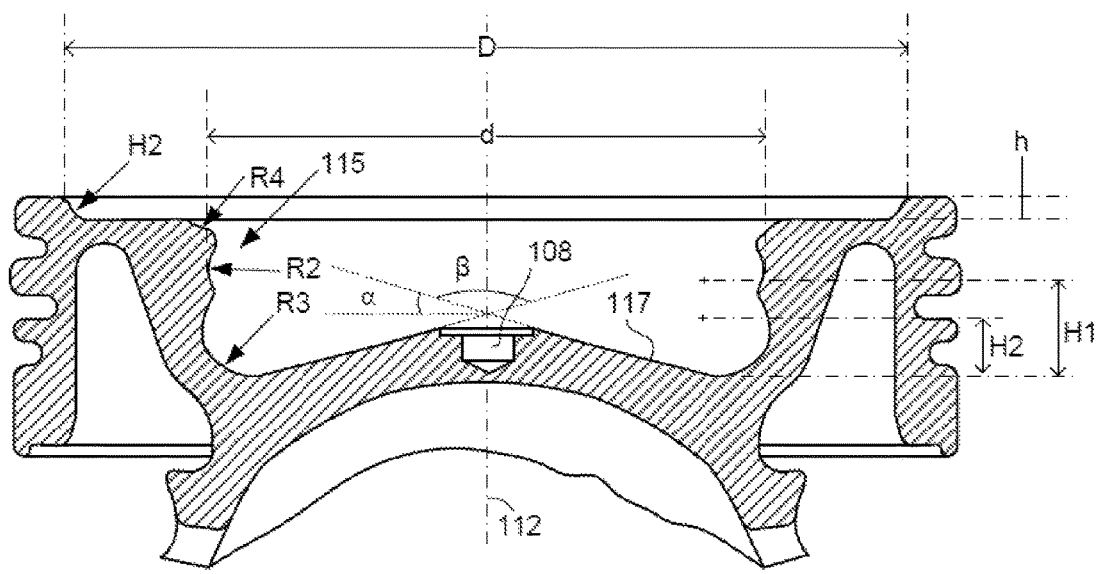
FIG. 3 is a partial cross section of the piston shown in FIG. 1.

Regarding other functional features of the piston 100, in reference to the orientation of the piston 100 shown in FIG. 1, the crown portion 102 forms a bowl 114 having generally a concave shape. The bowl 114 is surrounded by a rim 116. The rim 116 is centrally disposed relative to an annularly shaped, flat, crown surface 118. The crown surface 118 is disposed around the rim 116 of the bowl 114. A detailed, section view of the bowl 114 is shown in FIG. 3, and an enlarged detail view of a side portion of the bowl is shown in FIG. 2. As can be seen from these figures, the bowl 114 forms a frusto-conical central portion 117 around a depression 108 that is centrally located in the bowl 114, which can accommodate an injector tip (not shown) when the piston 100 is installed in an engine and assumes a top-dead-center position in the cylinder. The rim 116, central portion 117, and depression 108 are all concentrically disposed in the embodiment shown with respect to an axis of symmetry 112 (shown in FIG. 3) of the bowl 114. The frusto-conical central portion 117 may be formed at an included angle, β, of about 120 degrees around, and with respect with, the axis of symmetry 112. Accordingly, as shown, a floor angle, a (denoted in FIG. 3), which is the acute angle between the slope of the conical central portion 117 and the crown surface 118, is 30 degrees.

The bowl 114 advantageously forms various features along its side margin or outer portion 115, which operate to improve engine operation and permit injection of fuel over a wide range of engine crankshaft angles. In the embodiment shown in FIGS. 1-3, the bowl 114 forms a depressed ledge 200 that extends annularly around the bowl 114 immediately radially inwardly with respect to the rim 116. More specifically, the depressed ledge 200 is an annularly shaped, flat surface that extends along a plane that is parallel to a plane defined by the crown surface 118. An outer or first chamfer surface 202 is formed between the rim 116 and the depressed ledge 200 along a radially outward edge of the depressed ledge 200 with respect to the axis of symmetry 112. The first chamfer surface 202 is formed at a first radius, R1 (denoted in FIG. 3).

The depressed ledge 200 includes an inner edge 204 that extends annularly around an entire radially inward periphery of the depressed ledge 200. In the embodiment shown, the inner edge 204 is formed as a chamfered surface having a radius of about 1 mm or greater. The inner edge 204 of the depressed ledge 200 provides a transition between the depressed ledge 200 and a first surface 206. In the orientation of the piston 100 shown in the figures, the first surface 206 is formed at an uppermost region of the outer margin of the bowl 114, i.e., a region that is closest to the crown surface 118 along the axis of symmetry 112. As shown, the first surface 206 has a generally convex shape formed at a radius, R4, but may alternatively have a concave or conical cross section profile.

At a radially inward portion, the first surface 206 forms a first lip 208 having a generally convex shape. The first lip 208 extends peripherally around the bowl 114 and extends radially inward with respect to the inner edge 204 and the first surface 206. The first lip 208 separates the first surface 206 from a second surface 210. The second surface 210 has a generally concave shape that is formed at a second radius, R2 (denoted in FIG. 3). In a radially inward (or, downward with respect to the bowl) edge, the second surface 210 forms a second lip 212. The second lip 212 separates the second surface 210 from a third surface 214. The third surface 214 has a generally concave shape that is formed at a third radius, R3 (denoted in FIG. 3). The third surface 214 extends between the second lip 212 and the central portion 117, which meets the third surface 214 in a smooth fashion, as shown, tangentially.

As can be appreciated, the dimensions of the various features of the piston 100 may depend on various parameters, including an overall diameter of the piston 100, a desired compression ratio of the engine in which the piston 100 will be used, and others. However, the various features may be formed at particular geometrical ratios, or ranges of ratios, to achieve desired results.

To further illustrate the operation of the various features of the piston 100, it should be appreciated that the piston will operate in an engine having a fuel injector disposed and configured to inject fuel directly into the combustion cylinder of the engine, in which the piston reciprocally operates. As is known, the axial position of the piston within an engine cylinder is correlated with a rotation angle of the engine crankshaft. As such, particular ranges of the axial position of the piston within the cylinder may also be correlated with particular ranges of crankshaft rotation with respect to the particular respective cylinder. It should also be appreciated that the injectors used to provide the fuel into the cylinder during engine operation are configured to spray one or more streams of fuel into the cylinder at particular locations and times during operation. Fuel injectors are known to have nozzle openings that provide fuel jets at particular angles with respect to a cylinder bore centerline. Those jets, which typically open in a conical fashion as they travel away from the injector tip, define a generally cylindrical fuel plume that can have a plume diameter at various axial locations along the cylinder bore centerline. The plume, which may begin as a collection of individual streams, may take some time, for example, 0.7 ms, to fully develop or become stable after initiation of an injection event.

Accordingly, the various features of the piston include an inner diameter, d (denoted in FIG. 3), which is generally defined by the radially outermost point of the second surface 210, and is adjacent to the inner edge 204 of the depressed ledge 200. The inner diameter, d, surrounds the generally concave portion of the bowl 114 and can be selected such that it is consistent with, i.e. equal or large to, the diameter of a stable fuel plume for a particular crankshaft angle range in which fuel is provided into the cylinder that the piston 100 is operating. The outer diameter, D, which extends around the outer edge of the first chamfer surface 202, may be selected based on a desired ratio with respect to the inner diameter, d. In the illustrated embodiment, the ratio D/d is equal to 0.24 for nominal dimensions of the piston 100. Other dimensions include an angle, γ (denoted in FIG. 1), which is measured from the pin centerpoint to the first lip 208, that is about 65 degrees.

In the illustrated embodiment, the second radius, R2, of the second surface 210, and the third radius, R3, of the third surface 214, are equal. When the heights of their respective center-points for forming the curved surfaces are considered, a height H2 (denoted in FIG. 3) of the centerpoint for the third surface 214 is 66% of the height H1 (denoted in FIG. 3) of the centerpoint for the second surface 210, with respect to a lowermost point in the bowl 114. Regarding the radii R2 and R3, each is selected such that R2=R3=0.197*d, where d denotes the inner diameter, d, described above. The depth, h (denoted in FIG. 3) of the depressed ledge 200 with respect to the crown surface 118 is selected to be about 6% of the inner diameter, d. A radius, R4, of a convex-shaped first surface 206 is selected to be equal to the radii R2 and R3. Finally, the diameters R2, R3 and R4, are selected based on the inner diameter, d, according to the following relation: d=117.5/2*R, where R=R2, R3 or R4.

INDUSTRIAL APPLICABILITY

The present disclosure is applicable to pistons for internal combustion engines, which can be used in any application such as land or marine based applications, as well as for mobile or stationary applications. The various embodiments for piston features described herein have been found to have advantages in improving engine operation by increasing power output, decreasing fuel consumption and also decreasing emissions.

In general, the piston 100 forms various features that operate to redirect and/or contain various moving masses within the cylinder. Advantageously, the piston 100 operates such that the bowl 114 forms a reentrant bowl, which has a higher tolerance to retarded injection timing. Reentrance describes a condition in which fuel is injected into a generally concave feature formed at the top of the piston, such as the piston bowl 114, which forces a moving mass of fuel and air to circulate within the bowl and provide a more complete and efficient combustion that produces lower emissions than other engines. In the embodiment described herein, the bowl features operate to split the hot injector fuel plume that is provided to the cylinder when the piston is close to a top dead center position in the cylinder, and also which may be provided while the piston is approaching the top dead center position (e.g., pilot injection events) and/or is moving away from the top dead center position (e.g. post injection events during a combustion stroke). In other words, the bowl 114 is advantageously configured to increase the beneficial range of crankshaft angles over which fuel injected into the cylinder will benefit from reentrant features of the piston to lower engine emissions and increase fuel efficiency.

It is posited that the increased range over which the beneficial fuel reentrant features can be realized results from the stepped lip features created within the bowl, which in the illustrated embodiment are denoted as the first lip 208 and the second lip 212, as shown in FIG. 2. The side portions of the bowl, which can also be referred to as the flank edge, forms a double radius by incorporating the second surface 210 and the third surface 214, each having a concave shape that defines, at least partially, a toroidal cavity within the bowl. These toroidal cavities are believed to create swirling and turbulent motion in the burning fuel/air mixture that is pushed therein during an injection event, which assist in mixing additional air into the burning fuel and thus helps eliminate unburned or partially burned pockets of fuel and combustion products by oxidizing these substances to produce a more complete fuel burn.

As an additional advantage, by directing and/or generally confining the fuel into a central region of the cylinder, the fuel plume, a fuel atomization cloud, and/or a flame of burning fuel during these times of engine operation can be redirected in terms of flow direction and material dissipation in a fashion that reduces exposure of the various surrounding in-cylinder combustion surfaces to flame temperatures. By insulating cylinder surfaces from flame temperatures, retained heat and heat transfer to the metal of the surrounding engine components can be reduced, which in turn can provide a higher power output and/or higher power density to the engine, and also improve component reliability and service life. In the illustrated embodiment, the piston 100 achieves flow detachment along the crown surface 118 and material turbulation within the bowl 114 by the combined effects of the features formed in and around the bowl.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this disclosure are described herein. Variations of those preferred embodiments may become apparent to those of ordinary skill in the art upon reading the foregoing description. Skilled artisans are expected to employ such variations as appropriate. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A piston for an internal combustion engine, comprising:
a piston body forming a crown portion and a skirt portion, the skirt portion including a pin bore that is arranged to receive a pin for connecting the piston to a connecting rod, the skirt portion further forming two guide surfaces along outer margins of the skirt portion, the crown portion forming a generally cylindrical surface surrounding the crown portion, and a generally flat crown surface extending around an end of the crown portion disposed opposite the skirt portion;
wherein the generally flat crown surface forms a generally concave bowl within the generally cylindrical surface, the generally concave bowl extending symmetrically around the piston body with respect to an axis of symmetry of the crown portion;
wherein the generally concave bowl forms a first lip and a second lip that are arranged in a stepped configuration along a side margin of the generally concave bowl; and
wherein the crown portion further forms a depressed ledge having a generally annular shape, the depressed ledge including a flat, annular surface extending along a plane that is parallel to a plane defined by the generally flat crown surface, the depressed ledge disposed between the generally flat crown surface and the generally concave bowl;
wherein the piston body further forms a first chamfer surface between the depressed ledge and the generally flat crown surface, the first chamfer surface disposed along a radially outward edge of the depressed ledge and having a first radius of curvature;
wherein the depressed ledge includes an inner edge that extends annularly around an entire radially inward periphery of the depressed ledge;
wherein the piston body further forms a first surface at an uppermost region of the side margin of the generally concave bowl along a radially inward portion of the depressed ledge, the first surface forming the first lip having a generally convex shape;
wherein the first lip extends peripherally around the generally concave bowl and extends radially inward with respect to an inner edge and the first surface;
wherein the piston body further forms a second surface, the second surface having a generally concave shape that is formed at a second radius of curvature, the second surface forming the second lip having a generally convex shape, the second surface separated by the first surface along the first lip;
wherein the piston body further forms a third surface, the second lip separating the second surface from the third surface, the third surface having a generally concave shape that is formed at a third radius of curvature;
wherein the third surface extends between the second lip and a central portion of the generally concave bowl, the central portion of the generally concave bowl having a generally conical, convex shape;
wherein an inner diameter (d) of the piston, the inner diameter being defined by a radially outermost point of the second surface with respect to the axis of symmetry, is selected to be equal or larger than a diameter of a stable fuel plume for a particular crankshaft angle range in which fuel is provided into a cylinder of an engine that the piston is operating; and
wherein the second radius of curvature is equal to the third radius of curvature.

2. The piston of claim 1, wherein an outer diameter (D), which extends around an outer edge of the first chamfer surface, is selected such that a ratio D/d is equal to 0.24.

3. The piston of claim 1, wherein an angle (7), which is measured from a pin centerpoint to the first lip is about 65 degrees.

4. The piston of claim 1, wherein a height (H2) of a centerpoint for the third surface is 66% of a height (H1) of a centerpoint for the second surface with respect to a lowermost point in the generally concave bowl.

5. The piston of claim 1, wherein the second radius of curvature (R2) and the third radius of curvature (R3) are selected such that R2=R3=0.197*d.

6. The piston of claim 1, wherein a depth (h) of the depressed ledge with respect to the generally flat crown surface is selected to be about 6% of the inner diameter (d).

7. The piston of claim 1, wherein a fourth radius of curvature (R4) of the first surface is selected to be equal to the second radius of curvature (R2).

8. The piston of claim 7, wherein R2=R3=R4.

9. The piston of claim 8, wherein d=117.5/2*R.

* * * * *